Aug. 2, 1966 T. J. DANIEL ETAL 3,263,539

SINGULARLY MOUNTED CUTTERS OPERATIVE TO FORM BLANKS

Filed May 13, 1964 8 Sheets-Sheet 1

INVENTORS:
THOMAS J. DANIEL
WILLIAM C. HODSON
BY
Browne, Schuyler & Beveridge
ATTORNEYS INVENTORS
THOMAS J. DANIEL
WILLIAM C. HODSON
BY
Brown, Schuyler & Beveridge
ATTORNEYS Aug. 2, 1966 T. J. DANIEL ETAL 3,263,539

SINGULARLY MOUNTED CUTTERS OPERATIVE TO FORM BLANKS

Filed May 13, 1964 8 Sheets-Sheet 3

INVENTORS:
THOMAS J. DANIEL
WILLIAM C. HODSON
BY
Browne, Schuyler & Beveridge
ATTORNEYS INVENTORS
THOMAS J. DANIEL
WILLIAM C. HODSON
BY
Browne, Schuyler & Beveridge
ATTORNEYS Aug. 2, 1966 T. J. DANIEL ETAL 3,263,539

SINGULARLY MOUNTED CUTTERS OPERATIVE TO FORM BLANKS

Filed May 13, 1964 8 Sheets-Sheet 5

INVENTORS
THOMAS J. DANIEL
WILLIAM C. HODSON
BY
Browne, Schuyler & Beveridge
ATTORNEYS INVENTOR
THOMAS J. DANIEL
WILLIAM C. HOOSON
BY
Browne, Schuyler & Beveridge
ATTORNEYS SINGULARLY MOUNTED CUTTERS OPERATIVE TO FORM BLANKS
Filed May 13, 1964 8 Sheets-Sheet 7
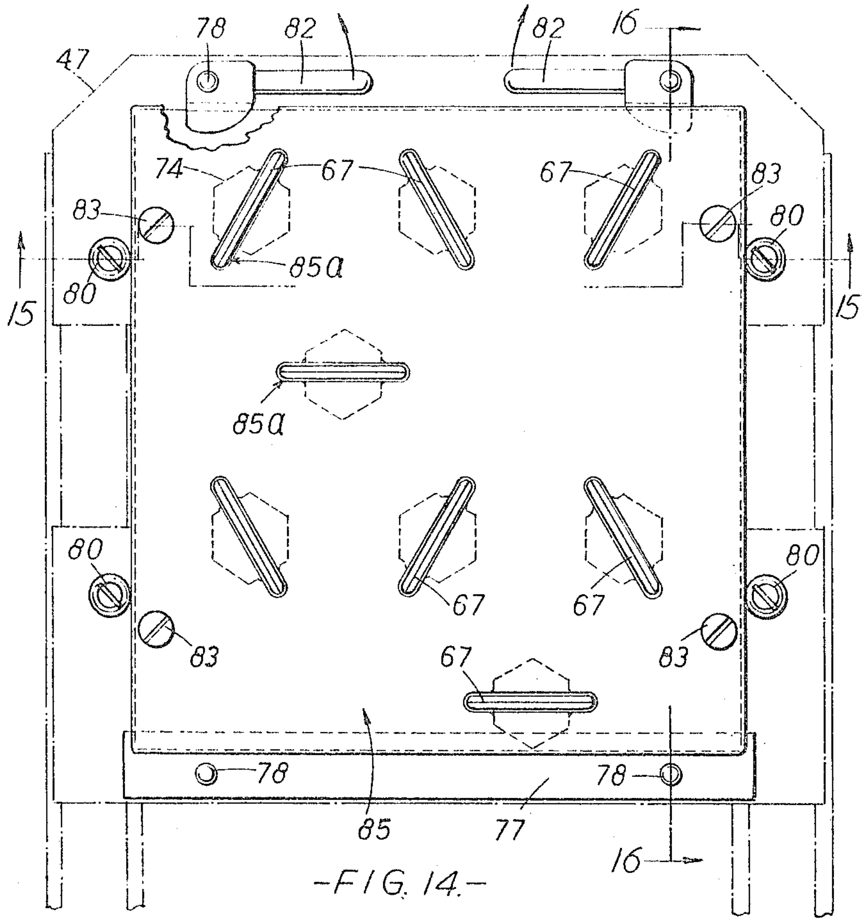
-FIG. 14.-
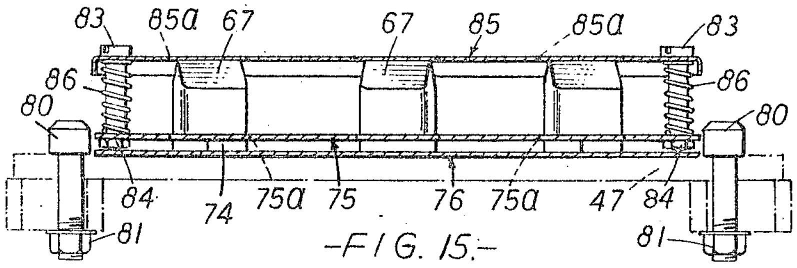
-FIG. 15.-
INVENTORS
THOMAS J. DANIEL
WILLIAM C. HODSON
BY
Browne, Schuyler & Beveridge
ATTORNEYS SINGULARLY MOUNTED CUTTERS OPERATIVE TO FORM BLANKS
Filed May 13, 1964 8 Sheets-Sheet 8
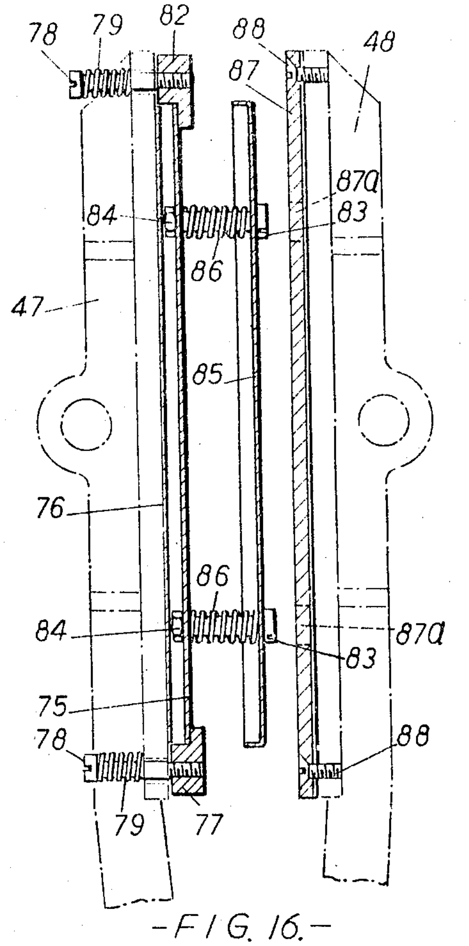
-FIG. 16.-
INVENTOR
THOMAS J. DANIEL
WILLIAM C. HODSON
BY
Browne, Schuyler & Beveridge
ATTORNEYS United States Patent Office 3,263,539
Patented August 2, 1966

3,263,539

SINGULARLY MOUNTED CUTTERS OPERATIVE TO FORM BLANKS

Thomas John Daniel and William Christopher Hodson, Shrewsbury, England, assignors to Rubber and Plastics Research Association of Great Britain, Shrewsbury, England, a British company Filed May 13, 1964, Ser. No. 367,117
Claims priority, application Great Britain, May 16, 1963, 19,438/63
7 Claims. (Cl. 83—140)

Figure 2:
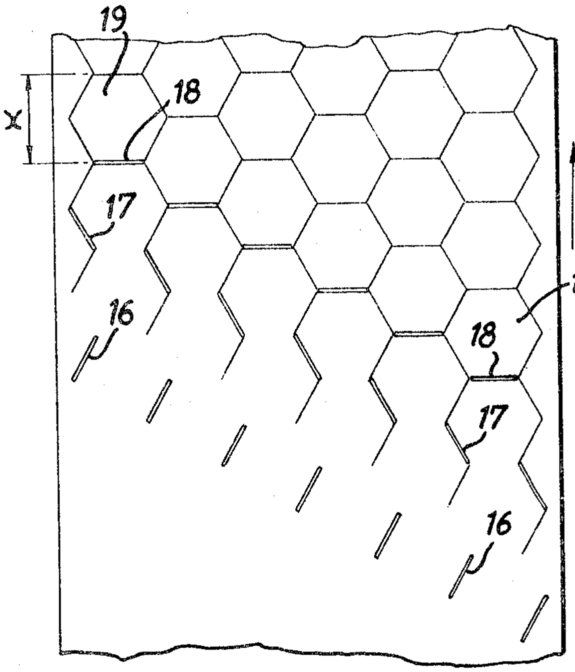

This invention relates to the cutting of blanks and is particularly concerned with blanks cut from mouldable sheet material such as milled or calendered rubber sheet.

Shaped rubber blanks for moulding purposes are normally punched out one at a time by means of a cutter because of the high cost of making multiple cutters which will punch out a plurality of blanks at a time. In cutting shaped blanks one at a time, there is frequently a substantial proportion of unvulcanised waste because the shapes of the blanks do not interlock and cover substantially the whole area of the rubber sheet. Reuse of this waste normally involves remilling or recalendering the waste.

Whilst square or rectangular blanks are satisfactory for some purposes, generally circular blanks and blanks of other shapes are desirable for mouldings such as diaphragms, and soles and heels. Whilst a generally circular blank could not be satisfactorily replaced by a square blank, in many cases it could be replaced by a hexagonal blank. Similarly, shaped sole and heel blanks could be replaced by appropriately shaped polygonal blanks. The geometry of regular hexagons and certain other polygons as indicated more fully below is such that they will fit together exactly so that they can be cut from a sheet of rubber with only the edge of the sheet being wasted.

We have now found that a range of different shaped interlocking blanks can be produced with a limited number of different sized blades which may be readily mounted on a cutting head in an arrangement appropriate to the shape selected. Such an arrangement is easier to produce than a multiple cutter of the aforementioned type.

According to the present invention blanks are cut with an assembly of cutting blades which is insufficient to cut out the blanks in a single initial cutting step but which is able to cut a plurality of blanks from sheet material by repeating the cutting step at least once and usually at least twice after relative displacement of the assembly and the sheet a predetermined distance in a predetermined direction following the first or the previous cutting step.

The blades are preferably straight edged blades, although curved blades may be used if desired. When mounted on the cutting head each blade may conveniently be spaced apart from adjacent blades and the resulting arrangement of blades is such that not all of the sides of any one blank are cut in a given cutting step.

Relative displacement between the assembly of blades and the sheet may conveniently be effected by moving the sheet a predetermined distance along a predetermined path between successive cutting steps, the distance moved being equal to that between successive repeats of the desired pattern of interlocking blanks in the direction of movement of the sheet. For continuous production of blanks, the sheet may be in strip form and moved parallel to its length, and the cutting steps are repeated as often as desired. It will be appreciated that while initially, at least two cutting steps are required to produce complete blanks, each cutting step after the first which produces complete blanks will also produce complete blanks.

If blanks are to be cut from mouldable sheet material and subsequently moulded, it does not matter if in cutting one blank the blades cut partially into adjacent blanks, since the latter cuts will be substantially healed during moulding of the blanks; provided that the latter cuts in combination are not long enough to cut completely across the blank or weaken it to such an extent that it disintegrates on handling. This means that a range of sizes of sides of blanks may be cut with a blade of a given size e.g. from sides only half the length of the blade up to sides the length of the blade. It also means that a complete range of blank sizes may be cut with blades of a limited number of sizes.

The invention includes apparatus for carrying out the cutting of blanks as described above. A suitable apparatus comprises a cutting head on which the blades may be mounted, a cutting bed against which the cutting head presses when cutting and means, such as rollers, for advancing the sheet material between the cutting head and the cutting bed after each cutting step. A particularly advantageous form of this apparatus is one in which the sheet material passes substantially vertically downwards between the cutting bed and the cutting head, the advantage being that only one set of rollers or other means for advancing the sheet is required and these are located above the cutting head and cutting bed with this arrangement; the take-off of the cut sheet material is effected by gravity. To facilitate the movement of the sheet material it is convenient to arrange that the blades do not cut out each blank so completely that it drops out of the sheet and the sheet disintegrates. This may be effected for example by putting a substantially central nick in some or all of the blades or by arranging that the blades do not cut through the complete thickness of the sheet so that the blanks are not completely separated from one another on cutting but may be readily separated subsequently when required for moulding purposes.

The blades may be mounted and held on the cutting head by any convenient means, for example, magnetic means. The blades may be easily fixed to and removed from the underside of the cutting head if the magnetic force for holding the blades in position on the undersurface of the cutting head is one that can be applied and released as desired. Alternatively the blades may be attached by mechanical means, for example by bolting a template containing the knives to the head.

To prevent the sheet from moving during the cutting steps, it is desirable that it should be held against the cutting bed during each of these steps. This may be effected by providing spring means arranged to contact the sheet immediately prior to the blades coming into contact with the sheet to effect cutting, and to remain in contact with the sheet until immediately after the blades are withdrawn from the sheet after cutting. Such spring means serve to strip the sheet from the blades after each cutting step. The spring means may be attached to the cutting head or to the blades. Magnetic or mechanical means may be used to attach the spring means to the cutting head. Alternatively the sheet may be held against the cutting bed by air pressure.

Several methods may be used for mounting the blades in the desired positions on the cutting head.

(1) The blades could be set manually. Apart from very simple blade arrangements, setting the blades manually would be tedious and liable to inaccuracy.

(2) The blades may be set using individual templates i.e. a template for each size and shape of blank. The template could be made of metal, plastic or plywood and could be provided with a series of slots or other means of accurately positioning the blades. In use such a template would be loaded with the appropriate blades and placed under the cutting head. The blades would then be held in place on the cutting head, for example by applying the magnetic force, and the template could then be removed. Alternatively the template and blades could be fixed to the cutting head mechanically.

(3) A template could be used which could be simply adjusted to locate accurately the blades necessary for producing various sizes and shapes of blanks. While such an adjustable template would be clearly advantageous in use, it could prove more expensive than a set of individual templates in a case where only a limited number of individual templates is needed. However, there are cases where an adjustable template can prove economic.

Figure 3:
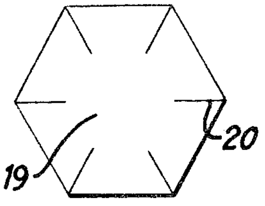
Figures 1, 4, 5:
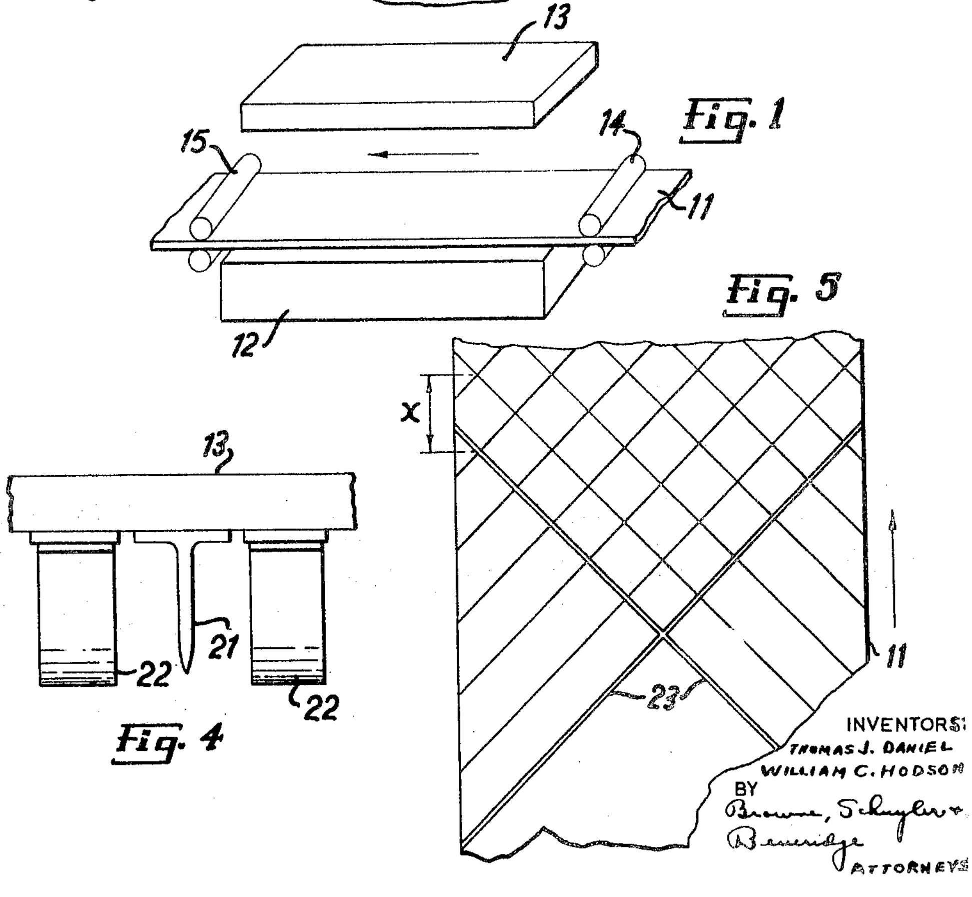
Figure 10:
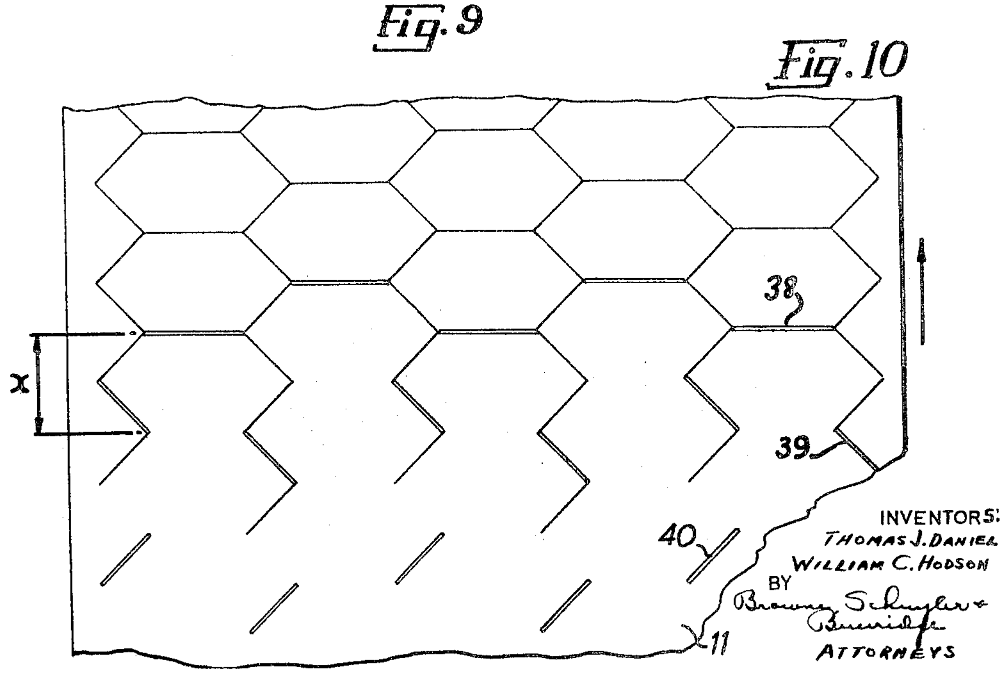
Figure 11:
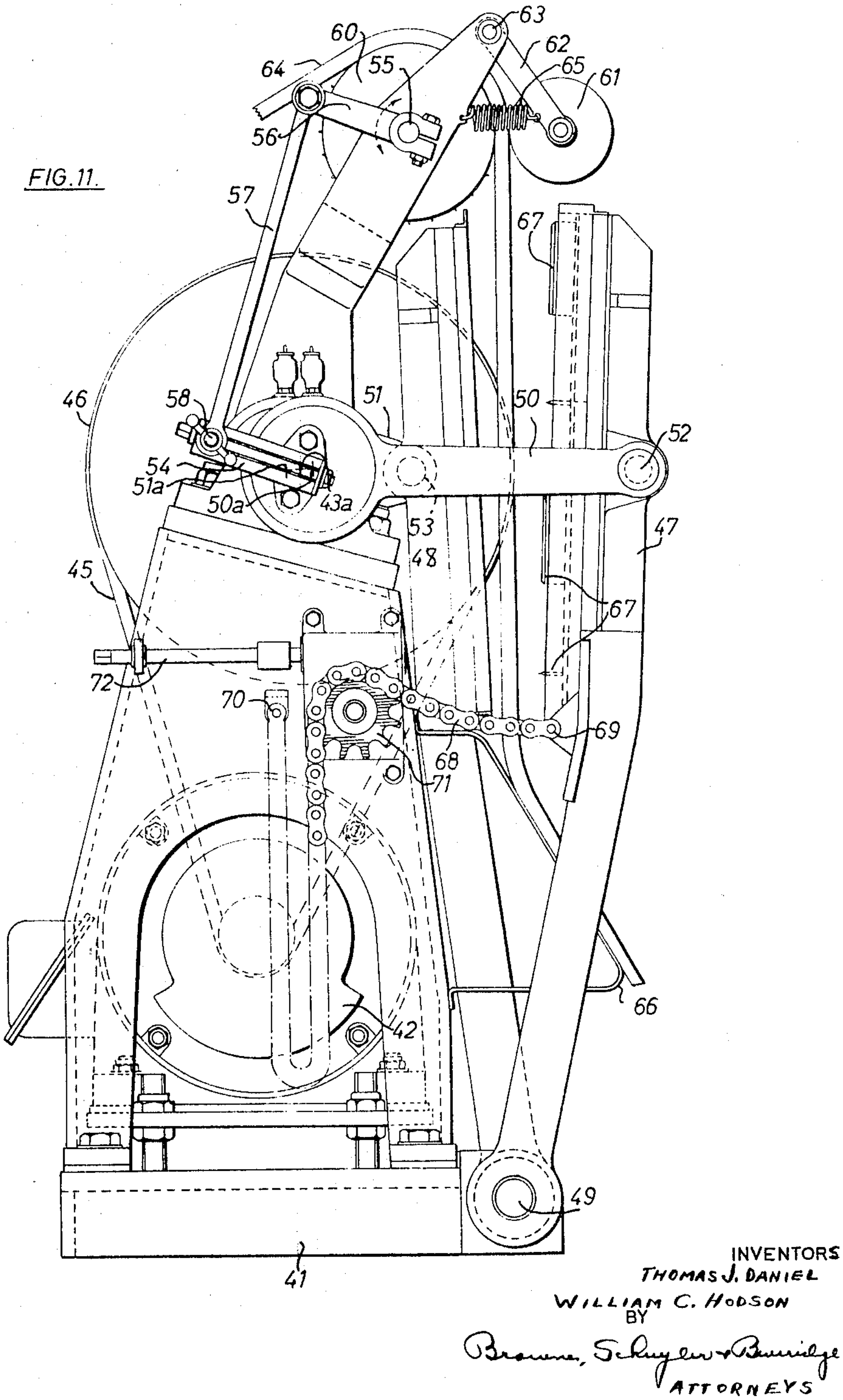
Figure 12:
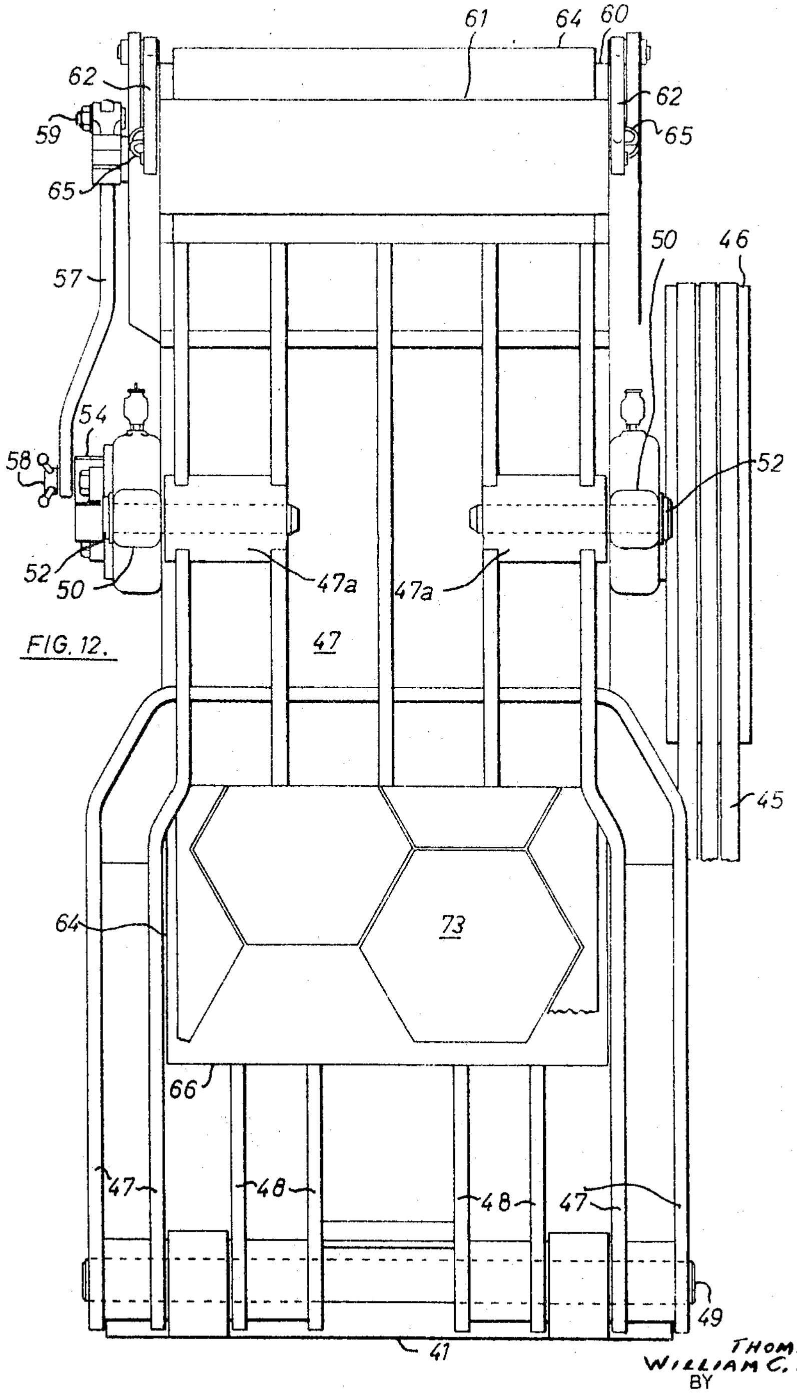
Figure 13:
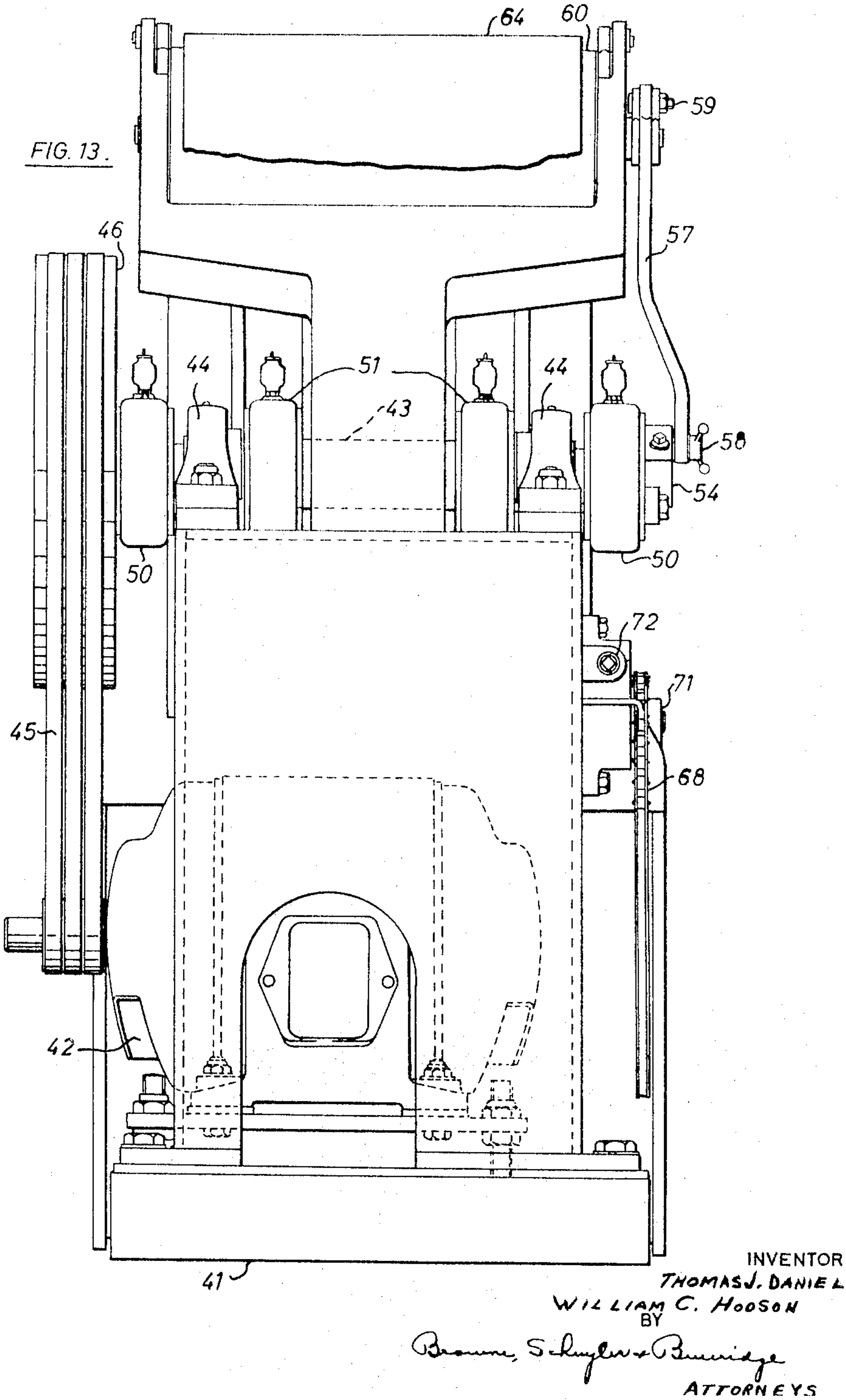

The invention will now be further described by way of example with reference to the accompanying drawings in which:

FIG. 1 is a simplified perspective view of an apparatus according to the invention, FIG. 2 illustrates a method of cutting hexagonal blanks using the apparatus of FIG. 1, FIG. 3 illustrates an hexagonal blank cut with blades longer than the sides of the blank, FIG. 4 is a fragmentary elevation of a cutting head fitted with spring means, FIGS. 5 to 9 illustrate methods of cutting blanks of shapes other than hexagonal, FIG. 10 illustrates an alternative method of cutting hexagonal blanks, FIG. 11 is an end elevation of a preferred apparatus according to the invention, FIGS. 12 and 13 are right hand and left hand side elevations respectively of the apparatus shown in FIG. 11, FIG. 14 is a detail plan view of the cutting head shown generally in FIG. 11, FIG. 15 is a section taken on the line 15—15 of FIG. 14, and FIG. 16 is a section taken on the line 16—16 of FIG. 14.

In the drawings like numbers refer to like parts.

It is to be appreciated that this description is by way of example only, and that apparatus according to the invention is not limited to this construction only.

Referring to FIG. 1, a continuous strip 11 of sheet rubber is positioned between the cutting bed 12 and the cutting head 13 of a punching press. At the ends of the press, the sheet 11 passes between pairs of rollers 14 and 15 which serve to advance the sheet intermittently across the surface of the cutting bed 12 in the direction of the arrow. The underside of the cutting head 13 is magnetic and the magnetic force exerted can be applied or released by operating a lever (not shown) so that steel cutting blades may be easily fixed to and removed from the surface. Alternatively this may be accomplished by mechanical means. Between the intermittent advances of the sheet, the cutting head is brought down rapidly against the rubber sheet, pressing the sheet hard against the cutting bed so that the blades cut through the rubber.

An arrangement of blades for producing interlocking blanks in the form of regular hexagons is shown in FIG. 2. Straight edged blades 16, 17 and 18 are spaced apart in three sets as shown. In the initial cutting step, these blades, mounted on the underside of the cutting head 13, produce three sets of spaced cuts in the sheet 11 shown in plan in FIG. 2, each cut corresponding to one side of a hexagon. The sheet is then advanced a distance $x$ in the direction of the arrow shown on the right in FIG. 2. From the drawing it will be seen that the distance $x$ corresponds to the distance between parallel sides of the hexagon. The second cutting step is then carried out giving three more sets of cuts. The process of advancing the sheet a distance $x$ followed by a cutting step is then repeated as often as desired. Four cutting steps are required to produce the first set of hexagonal blanks 19 but thereafter each successive cutting step produces a set of hexagonal blanks. As previously indicated, nicks (not shown) can be located in the blades so that the cut blanks do not fall apart after being punched out, or it can be arranged that the blades do not cut completely through the thickness of the rubber. The blanks remain sufficiently interconnected for the rollers 15 to advance the cut portion of the sheet 11.

Smaller hexagons than those shown in FIG. 2 can be cut with blades of the same size as those shown in FIG. 2 by rearranging blades 16, 17 and 18 so that each blade cuts part way through the adjacent blanks. The resultant blank 19, FIG. 3 (enlarged as compared with FIG. 2 although in absolute size smaller) has cuts 20 located in it. If cuts such as those shown in FIG. 3 are tolerated for moulding purposes, it is possible to produce regular hexagons of side length ½″ up to side length 1″ using only 1″ blades i.e. blades whose cutting edge is 1″ long. Thus by using only 1″, 2″ and 4″ blades it is possible to cut hexagons ranging from ½″ sided regular hexagons up to 4″ sided regular hexagons. This represents an area change of 1 to 64.

For making hexagonal blanks of these sizes, the strip 11 may be 15″ wide and the underside of the cutting head about 18″ by 16″. The advancement of the sheet between cutting steps may conveniently be capable of adjustment from ½″ to 8″.

FIG. 4 shows a steel blade 21 of T-section mounted on the cutting head 13. Typical dimensions for the T are: cross piece ¾″, upright 1″ and thickness ⅛″. Leaf springs 22 are mounted on either side of the blade 21. In general, considering the blade arrangement of FIG. 2, sets of such springs may be mounted between the sets of blades 16, 17 and 18. It will be seen that the springs 22 have a slightly greater depth than the blade 21 so that the springs come into contact with the strip 11 immediately before the blade hits the strip in the cutting step. The springs press on the strip but yield to allow the blade to cut the strip. When the cutting head is withdrawn, the springs continue to press on the strip until immediately after the blade leaves the strip. Thus the springs hold the strip firmly while the blades effect cutting and allow the blades to be pulled out of the strip after cutting.

FIG. 5 shows an arrangement for producing interlocking square blanks. A cutter in the form of two blades 23 intersecting at right angles (or four blades meeting at the same point) is mounted on the cutting head 13, the advancement of the strip 11 in the direction of the arrow between successive cutting steps being indicated by the distance $x$.

Square blanks may also be produced using a number of blades spaced apart on the cutting head but the cutter of FIG. 5 is to be preferred. Using the cutter of FIG. 5, the size of the square blanks may be varied simply by varying the advancement distance $x$, blade adjustment being unnecessary.

If the blades 23 of FIG. 5 are modified to intersect at an angle other than a right angle, diamond-shaped blanks result. If the blades 23 intersect at right angles but do not make equal angles with the direction of movement of the strip (compare the blades 23 as shown in FIG. 5), then rectangular blanks result. If the blades 23 intersect at an angle other than a right angle and do not make equal angles with the direction of movement of the strip, blanks in the form of parallelograms result.

Figure 6:
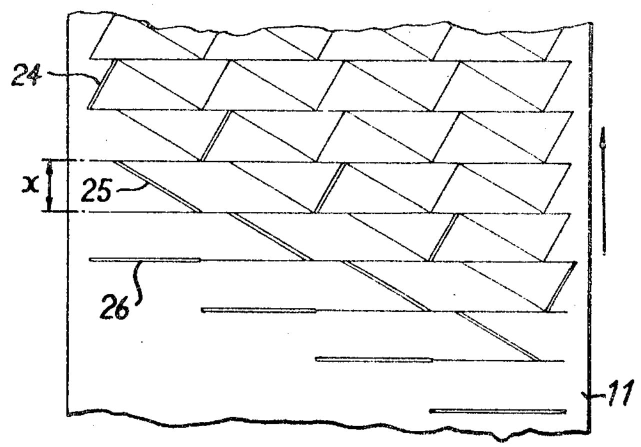
Figure 7:
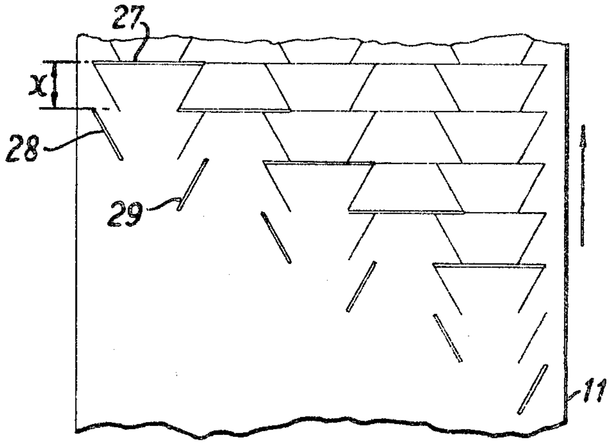
Figure 8:
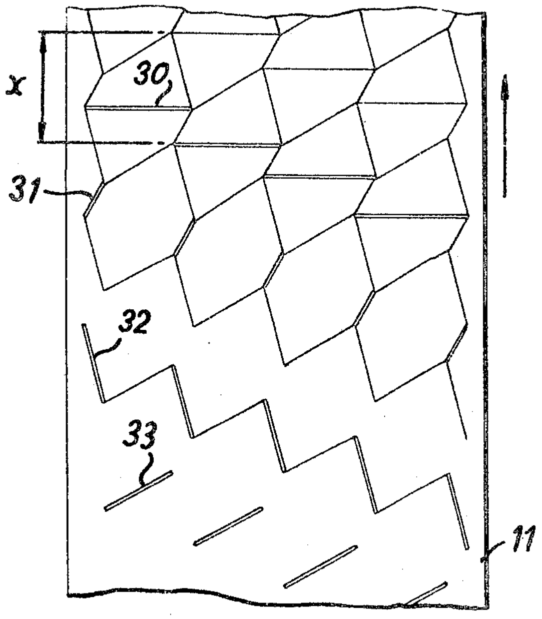
Figure 9:
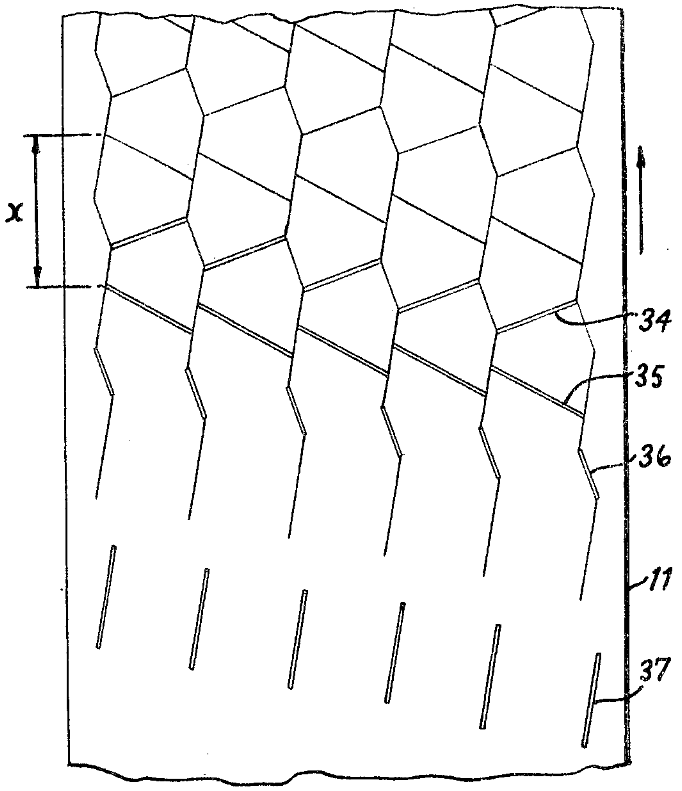

In FIGS. 6 to 10, the different sets of blades arranged on the cutting head 13 are identified by reference numerals 24 to 40 and the advancement of the strip 11 (in the direction of the arrow in each figure) between successive cutting steps is again indicated by distance $x$. FIG. 6 shows the cutting of triangular blanks; FIG. 7, trapezium-shaped blanks; FIG. 8, quadrilateral-shaped blanks; and FIG. 9, pentagon-shaped blanks. Thus interlocking blanks in the shape of any three or four sided figure or in the shape of some five-sided figures may be cut by the method of the invention. It will also be observed that if the blades 30 of FIG. 8 or the blades 35 of FIG. 9 were omitted, the resulting interlocking blanks would be hexagonal with three pairs of parallel sides. Thus it is possible also to cut out certain six-sided figures. FIG. 10 like FIG. 2 illustrates the production of hexagonal blanks, but in FIG. 10 a more compact arrangement of blades is used.

Referring to FIGS. 11 to 13, a main support member 41 carries a drive motor 42 and a driving shaft 43 rotatably mounted in bearings 44 carried by the support member 41. The shaft 43 is driven from the motor 42 by means of a belt 45 passing round a fly wheel 46 mounted on one end of the shaft 43. A cutting head generally designated 47 and a cutting bed 48 are pivotally mounted at 49 on the base of the support member 41. Cranks 50 and 51 are eccentrically mounted at 50*a* and 51*a* respectively on the shaft 43 whose axis is shown at 43*a* (FIG. 11) and are pivotally connected at 52 and 53 respectively to the cutting head 47 and the cutting bed 48. Each pivotal connection at 52 takes the form of a pivot pin passing through the outer end of the crank 50 into a bearing 47*a* in the cutting head 47.

A crank 54 is rotatably mounted on the shaft 43. A shaft 55 is rotatably mounted at the upper end of the support member 41 and carries a crank 56. A link 57 connects the cranks 54 and 56, being pivotally connected to the cranks 54 and 56 at 58 and 59 respectively. The pivotal connection 58 is adjustable so that the throw of the crank 54 may be varied.

A ratchet roller 60 is mounted on the shaft 55, the arrangement being such that the roller rotates with the shaft 55 when the shaft rotates in a clock-wise direction as seen in FIG. 11 but does not rotate with the shaft when the shaft rotates in an anti-clock-wise direction. As the throw of the crank 56 is greater than that of the crank 54, continuous rotation of the shaft 43 in a clock-wise direction as seen in FIG. 11 will cause the shaft 55 to rotate alternately in a clock-wise direction and an anti-clock-wise direction between the positions indicated by the arrows in FIG. 11.

A pressure roller 61 is rotatably mounted between arms 62 pivotally connected at 63 to the upper end of the support member 41. The rubber strip or other sheet material to be cut, 64, passes between the rollers 60 and 61. Spring connections 65 between the arms 62 and the upper end of the support member 41 cause the pressure roller 61 to press the strip 64 against the ratchet roller 60 and the strip is therefore gripped between the rollers. Below the rollers, the strip 64 passes between the cutting head 47 and cutting bed 48 and at its lower end is supported by a strip take-off member 66, carried by the main support member 41.

Blades 67 are mounted on the cutting head in the required positions as shown in more detail in FIGS. 14 to 16 and to facilitate the mounting and remounting of various blade arrangements, the cutting head 47 may be lowered into a horizontal position by removing the pivot pins 52 so as to disconnect the cutting head 47 from the cranks 50. For raising the cutting head after the blades have been fitted so as to reconnect it to the cranks 50, a lifting chain 68 is connected to the cutting head 47 at 69 and to the support member 41 at 70. Between these connections, the chain passes round a sprocket 71 which is mounted in the support member 41 so as to be rotatable by means of a shaft 72 also rotatably mounted in the support member 41. Thus, rotation of the shaft 72 raises or permits lowering of the cutting head 47 when the head is disconnected from the crank 50. It will be noted that there is a slack portion of the chain 68 which hangs between the sprocket 71 and the connection 70.

In operation, the motor 42 rotates the shaft 43 which in turn rotates the crank 54. The ratchet roller 60 is thus intermittently rotated and the sheet material is thus advanced downwards between the cutting head 47 and cutting bed 48 at intervals. The movement of the eccentrically mounted cranks 50 and 51 which results from the rotation of the shaft 43 causes the cutting head and cutting bed to move alternately towards and away from one another. As shown in FIG. 11, the cutting head 47 and the cutting bed 48 are at their maximum distance apart and the crank 56 is approximately half way through the stroke which causes rotation of the ratchet roller 60 and consequent advancement of the strip 64. As the shaft 43 rotates through 180° in a clock-wise direction as seen in FIG. 11, the cutting head 47 and the cutting bed 48 move towards one another and towards the strip which passes between them. Before the end of this amount of movement of shaft 43 is reached, rotation of the ratchet roller 60 has ceased since the arm 56 has reversed its direction of movement and is now rotating the shaft 55 in an anti-clock-wise direction without rotating the roller. The sheet material is therefore stationary before the end of the 180° rotation of shaft 43 is completed. At and near the end of the 180° rotation, the cutting bed and cutting head contact the strip and the blades 67 on the cutting head 47 cut through the strip, the cutting bed 48 contacting the strip to provide the necessary resistance to permit the cuts to be made. As the shaft 43 continues to rotate through a further 180°, which brings it back to the position shown in FIG. 11, the cutting head and cutting bed progressively separate and when they are well clear of the strip (which is incompletely cut through) the strip again starts to advance due to the clock-wise movement of the crank 56. The cut portion of the sheet material moves downwards under gravity in contact with the take-off member 66 and may be withdrawn as desired. In FIG. 12 the sheet is shown cut into hexagonal blanks 73.

Referring to FIGS. 14 to 16, blades 67 are formed with hexagonal bases 74. The blades 67 are passed through slots 75*a* in a template 75 until the bases 74 abut the template 75. The bases 74 are sandwiched between the template 75 and a back plate 76. The template 75 and back plate 76 are a push fit between a template retainer 77 and the cutting head 47, to which the retainer 77 is secured by means of screws 78 loaded by coil springs 79. The sides of the template 75 and back plate 76 are located on the cutting head 47 by means of pins 80 secured to the cutting head by nuts 81. Locking levers 82 clamp the template and back plate to the cutting head, the locking levers being secured to the cutting head by means of further screws 78 loaded by coil springs 79. The screws 78 serve as pivots for the locking levers 82 and the template may be unclamped from the cutting head by rotating the locking levers in the direction of the arrows shown in FIG. 14. The arrangement shown in the drawings enables the blades 67 to be quickly and securely fixed to the cutting head.

The template 75 carries projecting belts 83 secured thereto by nuts 84. A stripping plate 85 is slidable on the bolts 83 against the pressure of coil springs 86 on the bolts between the template and the stripping plate. The heads of the bolts serve to retain the stripping plate on the bolts. Slots 85*a* are located in the stripping plate 85 to allow the blades 67 to pass through the stripping plate.

FIG. 16 also shows the cutting bed 48 in relation to the cutting head 47. The cutting bed 48 carries a cutting plate 87 secured thereto by screws 88. The cutting plate 87 is provided with holes 87*a* to accommodate the heads of the bolts.

When the apparatus is operated as generally described previously with reference to FIGS. 11 to 13, and the cutting head 47 and cutting bed 48 approach one another, the stripping plate 85 first presses the strip of sheet material against the cutting plate 87. The width of the strip is such that the bolt heads are just clear of its edges and are accommodated in the holes 87*a* in the cutting plate 87. The stripping plate 85 holds the strip of sheet material to be cut firmly against the cutting plate while at the same time the stripping plate moves along the bolts 83 against the pressure of the springs 86, which urge the stripping plate against the sheet material and the cutting plate. The blades 67 pass through the slots 85*a* in the stripping plate and effect cuts in the sheet material. When the cutting head and cutting bed withdraw from one another, the stripping plate 85 holds the sheet material against the cutting plate 87 while the blades are withdrawn through the slots 85*a* in the stripping plate, which thus strips the sheet material from the blades.

As shown in the drawings, the invention is particularly advantageous in that simple straight-edged blades may be arranged to produce interlocking blanks of a variety of shapes and the use of expensive multiple cutters is avoided. Moreover, a basic collection of blades may be used to make up any one of a large number of blade arrangements on the cutting head and changing from one blade arrangement to another may be readily effected. A suitable basic collection of blades comprises, in addition to a cutter of the type shown in FIG. 5, 14 4" blades, 29 2" blades and 56 1" blades.

We claim:

1. Apparatus for cutting shapes from sheet material and comprising a support member, a cutting head and a cutting bed, said head and said bed being mounted on said support member for generally horizontal movement towards and away from each other, means for moving said head and said bed progressively towards and away from each other, means for displacing a strip of sheet material a predetermined distance substantially vertically downwards between said head and said bed when said head and said bed are spaced apart, an assembly of blades mounted in spaced-apart relation to one another on said head to make cuts in said strip material when said head and said bed are moved towards each other, the blades of the assembly being so arranged in relation to one another and in relation to the predetermined distance of displacement of the sheet material that cuts made in a plurality of cutting steps are needed to form said shapes.

2. Apparatus as claimed in claim 1 having a template mounted on said cutting head and said blades mounted in said template.

3. Apparatus as claimed in claim 1 having a stripping plate resiliently mounted on said cutting head to press said sheet material against said cutting head when said head and said bed are moved towards each other, said stripping plate having slots located therein to permit said blades to pass through said plate to cut said strip material.

4. The apparatus of claim 1 in which the blades are straight-edged.

5. Apparatus as claimed in claim 1 in which both the cutting head and the cutting bed are moveably mounted to execute a clapping action at each cutting step.

6. Apparatus as claimed in claim 1 in which the means for advancing the mouldable sheet material comprises an intermittently rotatable roller.

7. Apparatus as claimed in claim 6 and having a common prime mover mounted on said support, said common prime mover being arranged to actuate both said means for moving said head and said bed, and said means for rotating said drive roller.

References Cited by the Examiner

UNITED STATES PATENTS

| | | | |
|---|---|---|---|
| 1,603,265 | 10/1926 | Beyer | 83—237 X |
| 1,908,563 | 5/1933 | Slabaugh et al. | 83—623 X |
| 2,296,136 | 9/1942 | Bechtel | 83—599 |
| 2,307,889 | 1/1943 | Korsgaard | 83—623 X |
| 2,454,609 | 11/1948 | Miller | 83—32 |
| 2,593,715 | 4/1952 | Alder et al. | 83—257 |
| 2,680,937 | 6/1954 | Peiler | 83—598 |
| 2,776,008 | 1/1957 | Soderman | 83—133 |
| 2,811,203 | 10/1957 | Garbarino | 83—32 |
| 2,956,464 | 10/1960 | Charron | 83—257 |
| 3,112,666 | 12/1963 | Tauser | 83—133 |
| 3,180,191 | 4/1965 | Midgley et al. | 83—104 X |

WILLIAM W. DYER, Jr., *Primary Examiner.*

L. B. TAYLOR, *Assistant Examiner.*